July 29, 1930.  J. S. THOMPSON  1,771,594
FRICTION BRAKE
Filed April 30, 1927
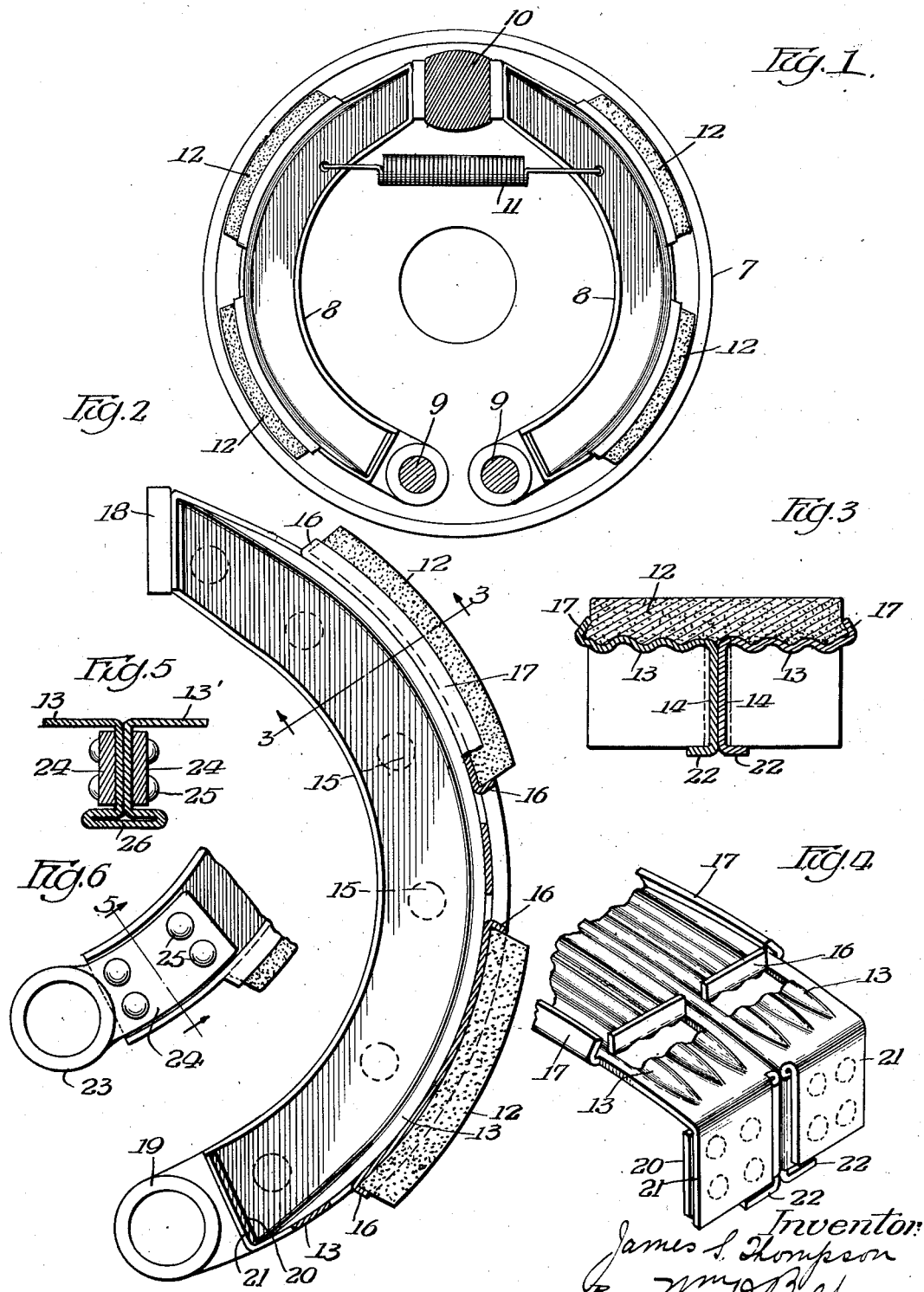

Patented July 29, 1930

1,771,594

UNITED STATES PATENT OFFICE

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK

FRICTION BRAKE

Application filed April 30, 1927. Serial No. 188,028.

This invention relates to friction brakes and while it is particularly important for use in the automotive industry, it can be used with equal satisfaction in many different kinds of friction brake installations. The invention is capable of use in internal expanding brakes, external contracting brakes, and in other forms of brake installations for which it is or may be adapted.

In co-pending applications, for example Serial No. 105,897 filed May 1, 1926, I have disclosed the use of composition brake blocks or shoes, as separate articles of manufacture, and means for securing them in operative position upon brake heads for internal and external brakes. These brake blocks may be made in different sizes, shapes and constructions and they may be secured on the brake head by different kinds of fastening devices. In my co-pending application Serial No. 183,378 filed April 13, 1927. I have disclosed a head consisting of a one-piece casting having recesses in which composition friction blocks are molded.

The object of this invention is to provide a novel brake head of strong and substantial construction but light in weight, which can be easily and quickly made of pressed steel and at relatively low cost.

A further object of the invention is to enable the brake blocks to be molded directly on the head or made separate and secured rigidly in place on the head without the use of separate fastening means.

And a further object of the invention is to make a pressed steel brake head of light but strong construction adapted to withstand the strains and stresses to which a brake head is normally subjected, and without being distorted.

In the accompanying drawings I have shown the invention in an internal expanding automotive friction brake, but it will be understood that the invention may be embodied in other types of friction brakes including contracting brakes.

Referring to the drawings:

Fig. 1 is an elevation, partly in section, of parts of a brake assembly showing the invention therein.

Fig. 2 is an enlarged view, partly in section, of one brake head.

Fig. 3 is a transverse sectional view on the line 3—3 of Fig. 2.

Fig. 4 is a detail perspective end view of a portion of the brake head.

Fig. 5 is a transverse sectional view on the line 5—5 of Fig. 6.

Fig. 6 shows another manner of securing the pivot member to the arm of the head.

In the drawings 7 is the brake drum, 8, 8 are the brake heads which are pivotally mounted on the studs 9, 9 and are adapted to be operated by the cam 10 and the spring 11 to move the friction blocks or shoes 12 into and out of operative contact with the rim of the drum. The construction of the drum, the manner of mounting the brake heads and the means for operating the brake heads form no part of this invention and need not be described in further detail.

Each of the heads 8 comprises a curved arm which is substantially T-shaped in cross section and is made of two longitudinal angle members, each having a face plate 13 and a web 14. These members are arranged with their webs 14 in contact and the webs are fastened together by spot welding at suitable intervals 15 or by other means. The angle members are curved longitudinally and when the webs are secured together the face plates 13, 13 are arranged in the same arc and together constitute the face plate of the head. The face plates 13, 13 may be corrugated lengthwise for greater strength, if desired.

The face plates 13, 13 are cut transversely and struck up to provide end flanges 16, and the face plates are provided with upturned side flanges 17, these end and side flanges forming a seat to receive the block or shoe 12. The seats on each head may be in any number, size and shape and they may be spaced apart and arranged as desired. In the drawings I have shown each head provided with two seats and two blocks and these blocks are spaced from the ends of the head and are also spaced from each other.

These blocks are made out of a suitable composition which will provide the desired braking friction and they are preferably wear and heat resistant. The flanges 16 and 17 may be inturned as shown and the block may be molded directly in the seat; or the flanges may be left straight to receive separate blocks after which the flanges are pressed inwardly to make locking engagement with the blocks. In either case the blocks will be held securely and rigidly in place on the head.

A wear plate 18 is secured to one end of the arm and an eye member 19 is secured to the other end of the arm by spot welding or other means. At each end of each angle member the web 14 is bent to form a laterally projecting end piece 20 and the face plate 13 is bent to form a downwardly projecting end piece 21. The end pieces 20 and 21 at each end of each angle member overlap and are secured together by spot welding or other means. The wear plate 18 and the eye piece 19 are spot welded or otherwise suitably secured to the overlapped end pieces 20, 21 which provides a strong and substantial anchorage for the wear plate and for the eye member. The free margins of the webs 14, 14 are turned outward to form ribs 22 which may lie substantially parallel with the face plates 13, 13 and strengthen the arm.

Instead of providing the overlapping end pieces 20, 21 to which the eye member is secured, I may make an eye member 23, as shown in Figs. 5 and 6 with parallel jaws 24 to receive the webs 14, 14, the parts being rigidly secured together by bolts or rivets 25, or by spot welding. The face plates may be flat, as shown at 13′ in Fig. 5, instead of being corrugated as shown at 13 in Figs. 3 and 4. And instead of making the angle members separate they may be pressed up from a single sheet of metal with a connecting rib 26 and with the webs spot welded or otherwise secured together as heretofore described.

My invention provides a novel brake head of light and simple construction which can be easily manufactured at relatively low cost and which will satisfactorily perform its functions. The friction blocks may be molded directly in their seats on the head or they may be made separately and readily secured in rigid position on the head. It is intended that the head should be made of sheet metal cut and pressed to desired shape, since this can be done at relatively low cost, and since blocks may be used which will give long and efficient service it may be found to be satisfactory to scrap the head when the blocks are worn to the limit of wear and substitute a new head; but it is obvious that the flanges 16 and 17 may be easily opened to receive new blocks and then clamped down upon the new blocks, so that if found desirable worn blocks may be replaced by new blocks.

I have shown and described the invention in a simple form, but I am aware that changes in the form, proportion and construction of parts will be necessary to adapt it for different friction brake installations in the automotive as well as in other fields and I reserve the right to make all such changes as fall within the scope of the following claims.

I claim:

1. A brake head for a friction brake comprising a pressed sheet metal arm having a face plate, said plate being corrugated longitudinally thereof to form a seat for a brake block.

2. A brake head for a friction brake comprising a pressed sheet metal arm corrugated longitudinally.

3. A brake head for a friction brake comprising a pressed sheet metal arm having a face plate corrugated longitudinally.

4. A brake head for a friction brake comprising a pressed sheet metal arm having a face plate, a friction block seated on the outer face of said plate, and transverse flanges struck up and projecting outwardly from the face of the plate to engage the ends of the brake block.

5. A brake head for a friction brake comprising a pressed sheet metal arm having flanges thereon spaced from its ends forming a four-sided seat, and a friction block secured in said seat.

6. A brake head for a friction brake comprising a pressed sheet metal arm having side flanges thereon and end flanges struck up therefrom and forming a seat spaced from the ends of the arm, and a friction block secured in said seat.

7. A brake head for a friction brake comprising a pressed sheet metal arm having a pair of transverse end flanges thereon forming a seat, and a friction block secured in said seat by frictional engagement of said flanges therewith.

JAMES S. THOMPSON.